United States Patent [19]
Bharathan et al.

[11] Patent Number: 6,158,005
[45] Date of Patent: Dec. 5, 2000

[54] CLONING PROTECTION SCHEME FOR A DIGITAL INFORMATION PLAYBACK DEVICE

[75] Inventors: Vipin Bharathan, New York, N.Y.; Ajit V. Rajasekharan, East Brunswick; Sugeet K. Shah, West Paterson, both of N.J.; Guy A. Story, Jr., New York, N.Y.

[73] Assignee: Audible, Inc., Wayne, N.J.

[21] Appl. No.: 09/151,384

[22] Filed: Sep. 10, 1998

[51] Int. Cl.[7] ................................................. G06F 12/14
[52] U.S. Cl. .......................... 713/200; 713/176; 380/202
[58] Field of Search .................. 380/46, 47, 3, 380/4, 25, 247, 248, 202, 232; 713/200, 170, 201, 176, 202, 169; 709/228, 227, 229, 217; 235/380

[56] References Cited

U.S. PATENT DOCUMENTS

| | | | |
|---|---|---|---|
| 5,091,942 | 2/1992 | Dent | 380/46 |
| 5,191,573 | 3/1993 | Hair. | |
| 5,237,612 | 8/1993 | Raith | 380/23 |
| 5,513,260 | 4/1996 | Ryan | 380/202 |
| 5,574,787 | 11/1996 | Ryan | 713/716 |
| 5,659,613 | 8/1997 | Copeland et al. | 380/202 |
| 5,675,734 | 10/1997 | Hair. | |
| 5,926,624 | 7/1999 | Katz et al. | 709/228 |
| 5,966,440 | 10/1999 | Hair. | |

*Primary Examiner*—Robert W. Beausoliel, Jr.
*Assistant Examiner*—Pierre Eddy Elisca
*Attorney, Agent, or Firm*—Blakely, Sokoloff, Taylor & Zafman LLP

[57] ABSTRACT

A method and apparatus for cloning protection of a player. The present invention provides a method and apparatus for providing cloning protection of a software digital information playback device by using an activation procedure prior to use of the playback device. In one embodiment, the playback device is deactivated in order to move the playback device to a different computer system or to otherwise vary the operating conditions of the playback device. To activate the playback device a unique identifier is generated by the playback device. The identifier is communicated to a server and linked to the playback device generating the identifier. In one embodiment, the identifier and a digital signature authenticating the information from the server are communicated to the playback device along with any digital programming. Only digital programming including the identifier and the signature are played by the playback device.

11 Claims, 6 Drawing Sheets

CLONING PROTECTION SCHEME FOR A DIGITAL INFORMATION PLAYBACK DEVICE

FIELD OF THE INVENTION

The present invention relates to digital information playback. More particularly, the present invention relates to cloning protection of digital information playback devices.

BACKGROUND OF THE INVENTION

Technology currently exists through compression of digital data, storage devices and network bandwidth to distribute large amounts of digital data to many geographically disparate locations. This technology has allowed more users access to more information in digital format than would otherwise be possible. One form of digital data is audio/visual (A/V) programming, including audio-only programming and video-only programming as well as combined audio/visual programming. Sources now exist that provide A/V programming, including audio recording of novels (audio books), recording of conversations, commentaries, news, educational material, etc. as well as recordings that include video content.

Digital programming can be played back by using a hardware device or software player on a personal or other type of computer system. Hardware playback devices are typically small lightweight devices having a special purpose processor coupled to memory, such as flash memory, that plays the stored digital programming. Software players are software entities executed by computer systems that use the computer system memory to store the digital programming and the computer system A/V capabilities to play the digital programming.

Hardware playback devices are typically difficult to clone because identification codes or other security components can be hardwired into tamper-resistant packaging. This prevents a user from buying a playback device and copying the identification or other code into an unauthorized playback device, which can then be used for unauthorized playback of digital programming.

Software players, however, are more difficult to protect from cloning because the player must be copied in order to install the player on a computer system. Thus, copy protection schemes are not appropriate for cloning protection. What is needed is cloning protection features for software players.

SUMMARY OF THE INVENTION

A method and apparatus for cloning protection of a digital information player is described. A player identifier that identifies the player is generated. The player identifier is sent to a server with an activation request. An activation message is received from the server that has the player identifier and a secondary identifier. The activation message is authenticated. The activation message is stored if authentic.

BRIEF DESCRIPTION OF THE DRAWINGS

The present invention is illustrated by way of example, and not by way of limitation, in the figures of the accompanying drawings in which like reference numerals refer to similar elements.

DETAILED DESCRIPTION

A method and apparatus for cloning protection of a digital information player is described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

The present invention provides a method and apparatus for providing cloning protection of a digital information player by using an activation procedure prior to use of the player. In one embodiment, the player is deactivated in order to move the player to a different computer system or to otherwise vary the operating conditions of the player.

To activate the player a unique identifier is generated by the player. The identifier is communicated to a digital information server or other device and associated with the player generating the identifier. In one embodiment, the identifier and a digital signature authenticating the information from the server are communicated to the player along with any digital programming. Only digital programming including a matching identifier and an authenticating signature are played by the player.

Figure 1:
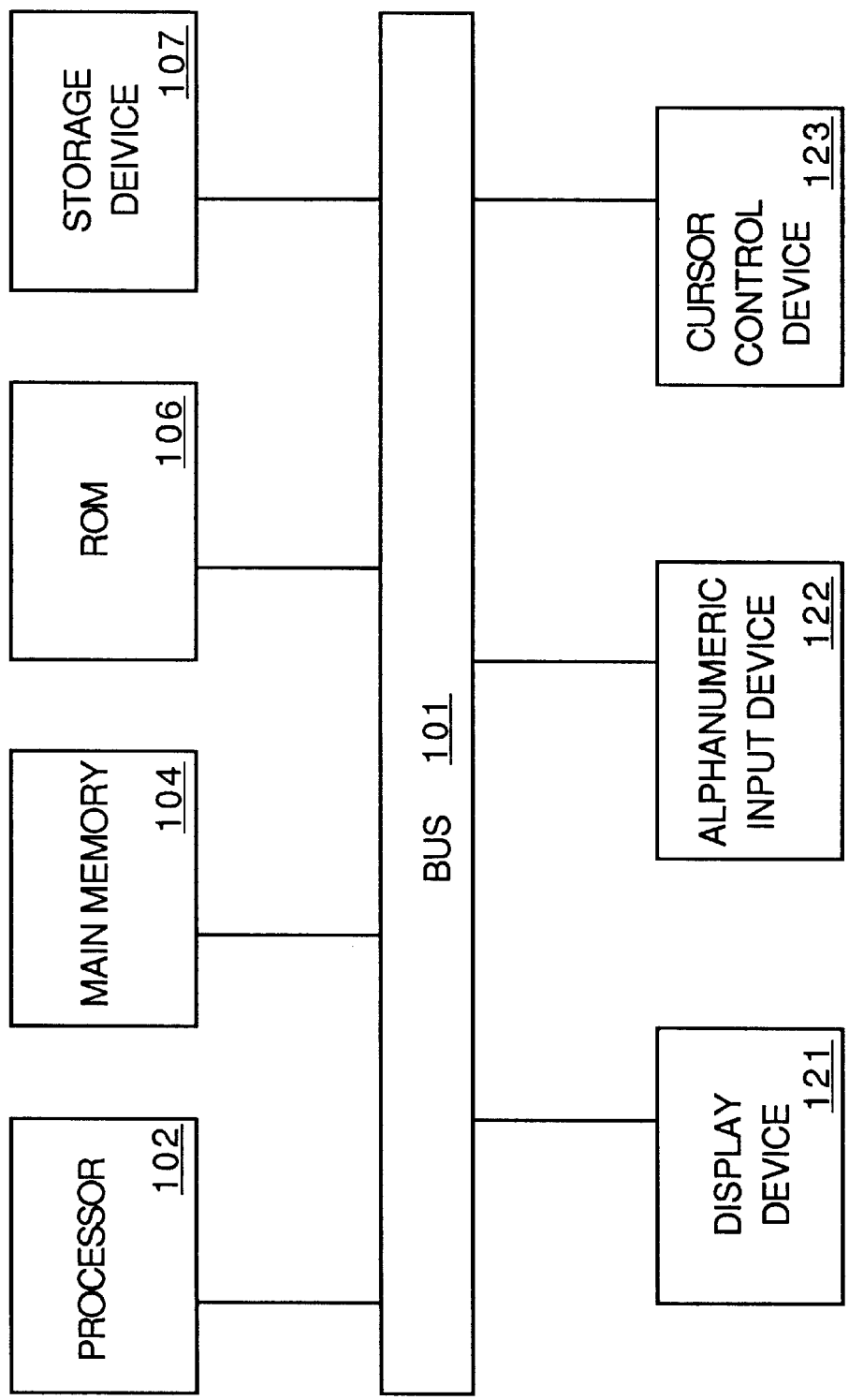
FIG. 1 is one embodiment of a computer system.

FIG. 1 is one embodiment of a computer system. Computer system 100 includes bus 101 or other communication means for communicating information, and processor 102 coupled with bus 101 for processing information. Computer system 100 further includes random access memory (RAM) or other dynamic storage device 104 (referred to as main memory), coupled to bus 101 for storing information and instructions to be executed by processor 102. Main memory 104 also can be used for storing temporary variables or other intermediate information during execution of instructions by processor 102. Computer system 100 also includes read only memory (ROM) and/or other static storage device 106 coupled to bus 101 for storing static information and instructions for processor 102. Data storage device 107 is coupled to bus 101 for storing information and instructions.

Data storage device 107 such as a magnetic disk or optical disc and its corresponding drive can be coupled to computer system 100. Computer system 100 can also be coupled via bus 101 to display device 121, such as a cathode ray tube (CRT) or liquid crystal display (LCD), for displaying information to a computer user. Alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121.

The present invention is related to the use of computer system 100 to provide cloning protection for digital information players. According to one embodiment, cloning protection is performed by computer system 100 in response to processor 102 executing sequences of instructions contained in memory 104.

Execution of the sequences of instructions contained in memory 104 causes processor 102 to provide cloning protection, as will be described hereafter. Instructions are provided to main memory 104 from a storage device, such as magnetic disk, CD-ROM, DVD, via a remote connection (e.g., over a network), etc. In alternative embodiments, hard-wired circuitry can be used in place of or in combination with software instructions to implement the present invention. Thus, the present invention is not limited to any specific combination of hardware circuitry and software.

Figure 2:
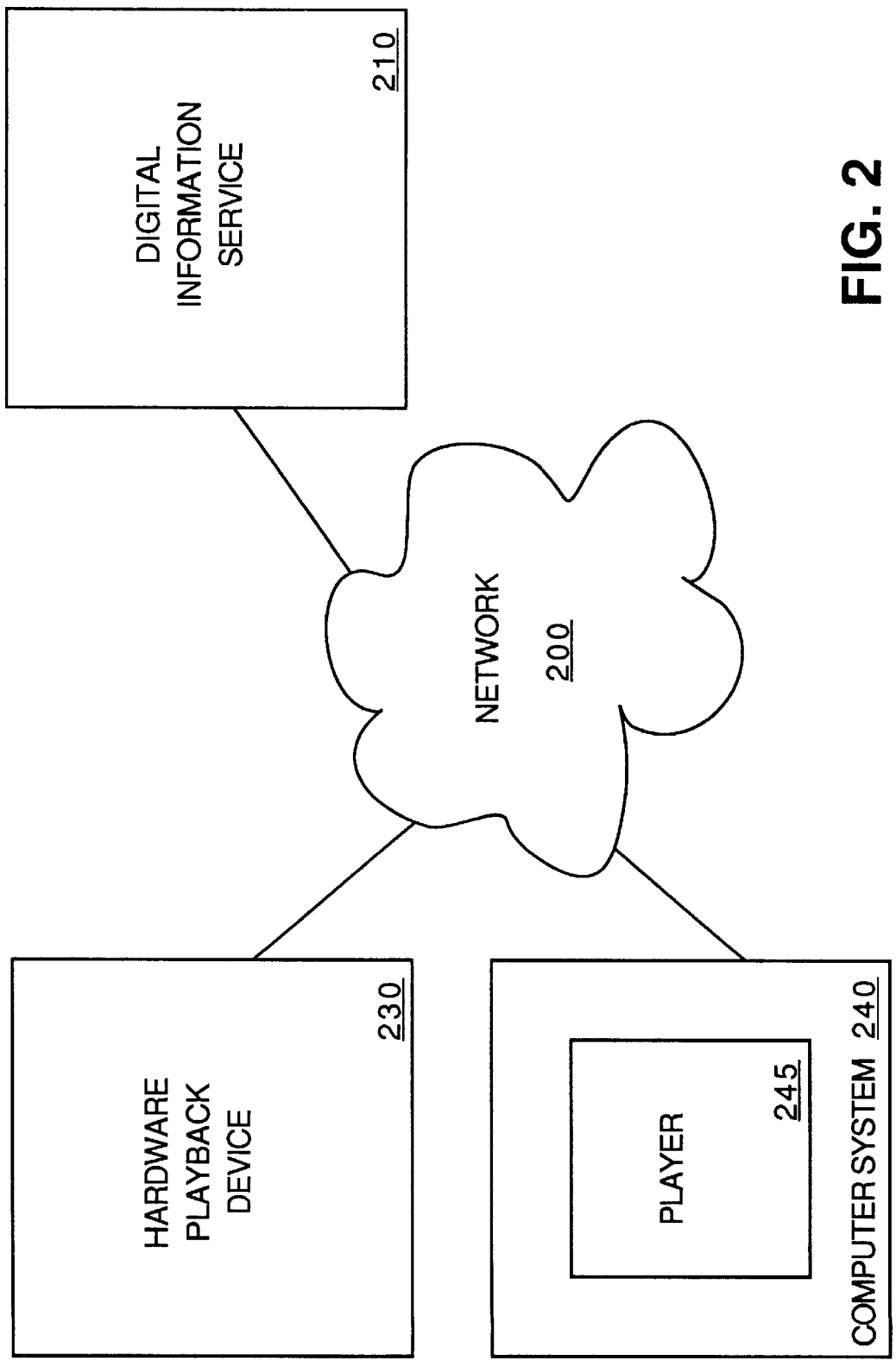
FIG. 2 is one embodiment of an architecture that provides digital information for playback.

FIG. 2 is one embodiment of an architecture that provides digital information for playback. Server 210 is coupled to multiple playback devices, including hardware playback devices (e.g., 230) and players (e.g., 245 running on computer system 240), by network 200. Any number of hardware playback devices and players can be coupled to server 210 by network 200.

In one embodiment, network 200 is the Internet; however, other networks can be used. For example, network 200 can be an intranet that couples only computer systems and other devices together that belong to a particular organization. Network 200 can also represent a group of networks, such and a group of local area networks.

Server 210 stores digital information defining programming as well as information about authorized users of the digital information. In one embodiment, server 210 stores a library of A/V programs that can be retrieved by authorized users for later playback by authorized playback devices. The library of A/V programs can include audio books, recordings of lecture series, news, plays, movies, etc.

Hardware playback device 230 stores programs from server 210 for playback. Hardware playback device 230 can store all or a portion of one or more programs. Also, hardware playback device 230 can be coupled to network 200 directly or by a computer system (not shown in FIG. 2) that accesses server 210.

Computer system 240 runs player 245 that plays programming from server 210. In one embodiment, player 245 must be activated by registering with server 210 prior to playing programming from server 210. Activation is described in greater detail below. In one embodiment, activation links player 245 to computer system 240 such that player 245 must be running on computer system 240 to play digital programming from server 210. Thus, player 245 running on a different computer system could not play programming from server 210.

Figure 3:
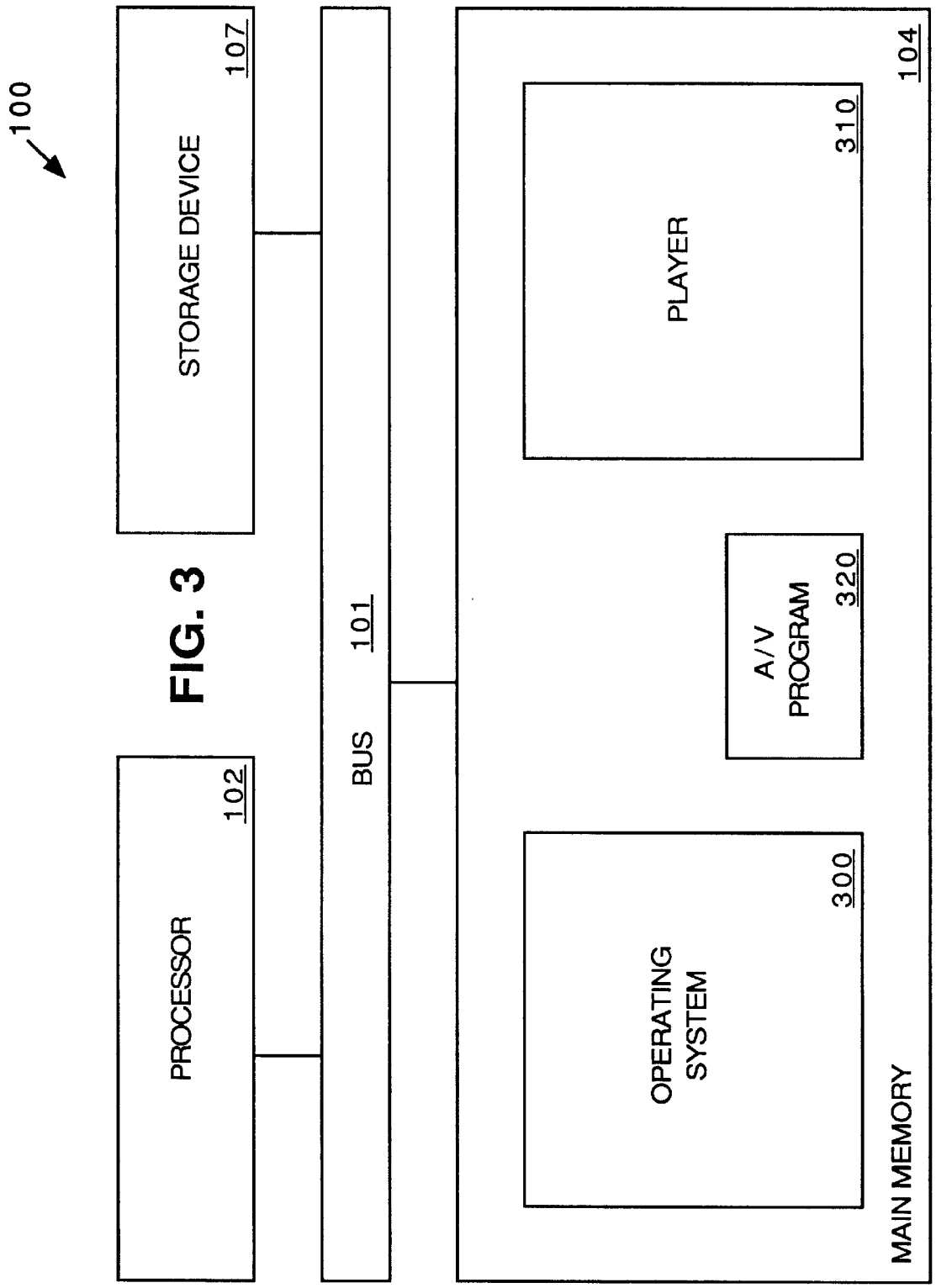
FIG. 3 is one embodiment of a computer system running a digital information player.

FIG. 3 is one embodiment of a computer system running a digital information player. Processor 102 executes sequences of instruction stored in main memory 104 including sequences of instructions defining operating system 300 and player 310.

In one embodiment, player 310 includes sequences of instructions to generate a player identifier (PlayerID) based on operating system 300 installation identifier and the installation date of operating system 300. Other values can be used to generate the PlayerID; however, using values that are unique to the specific the computer system running player 310 improves cloning protection. The PlayerID is not required to be absolutely unique as compared to all other computer system; the PlayerID is only required to be an identifier that provides a large population of potential identifiers.

In one embodiment, the PlayerID is communicated to a server over a network (not shown in FIG. 3) to activate player 310. Once activated, player 310 can be used to play programming received from the server with which player 310 has been activated. In one embodiment, player 310 only plays programming from the server that includes a copy of the PlayerID and a digital signature authenticating the program as from the server.

Main memory 104 further includes A/V program 320 that is all or a portion of programming received from the server. Additional programs, or additional portions of A/V program 320, can be stored by storage device 107 and copied to main memory 104 as necessary.

Figure 4:
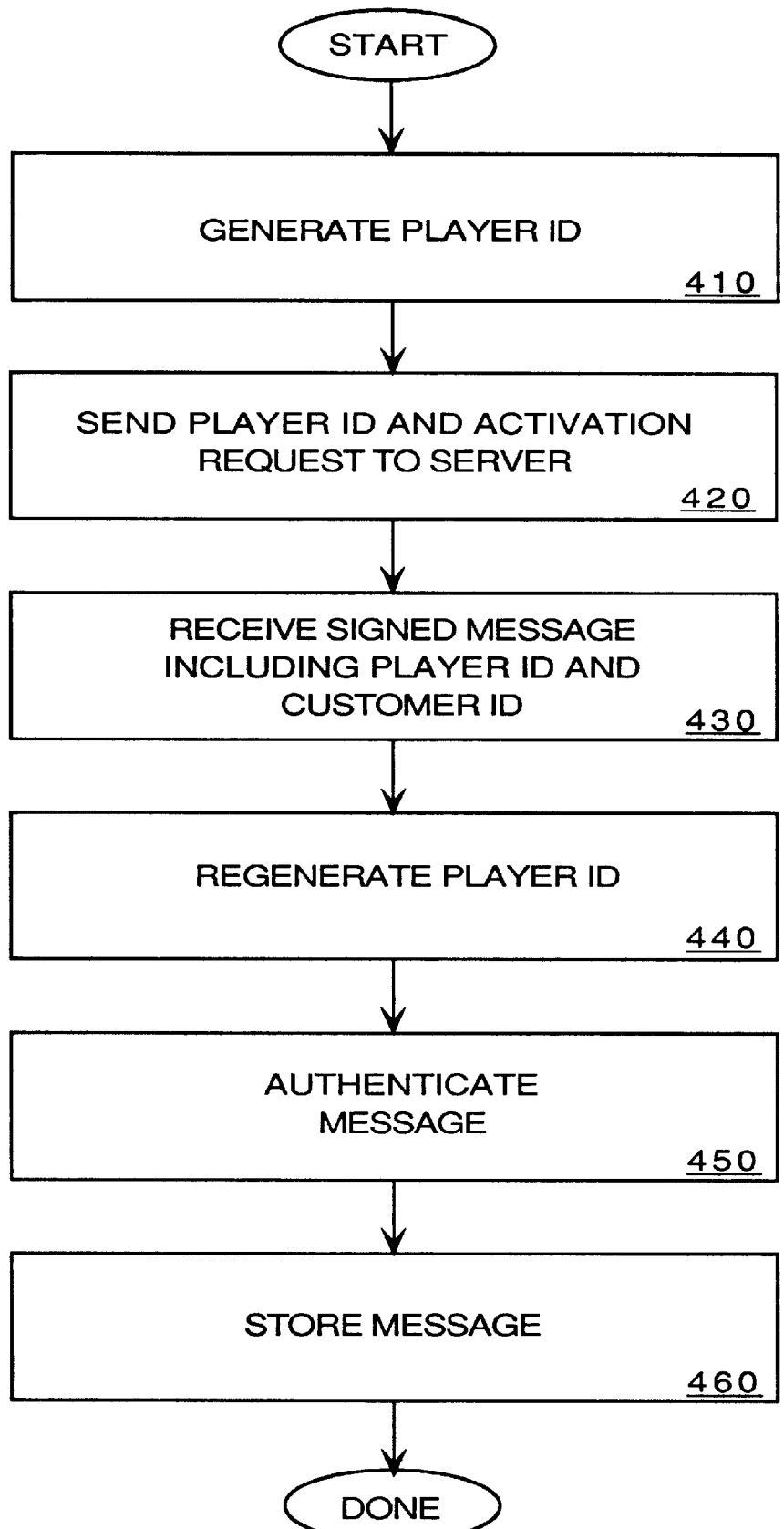
FIG. 4 is one embodiment of a flow diagram for player activation.

FIG. 4 is one embodiment of a flow diagram for player activation. The player generates a PlayerID, 410. In one embodiment, the PlayerID is generated by a hashing function based on an operating system installation identifier and the operating installation date. Of course, other identifiers, dates, etc. can be used to generate the PlayerID. The PlayerID is used to associate a particular player to particular hardware with reasonable certainty. Any identifier that associates the particular player with the particular hardware can be used.

The PlayerID and an activation request is sent to a server, 420. In one embodiment, the player must be activated with each server or group of servers. In other words, servers do not automatically activate the player with other, unrelated servers.

In one embodiment, the server generates a SecondaryID or retrieves an existing, for example, SecondaryID in response to the activation request. The SecondaryID can be generated for a new customer or retrieved if the activation request is coming from a player being activated by an existing customer. The server stores the association of the SecondaryID and the PlayerID for later use.

The server generates a message including both the PlayerID received from the player and the SecondaryID generated or retrieved by the server. In one embodiment, the message is signed with a digital signature to authenticate the source of the message. Any type of digital signature or other authentication scheme can be used. The signed message is sent to the player.

The SecondaryID can be used for several purposes. For example, a particular customer can be limited to having a preselected number of players. In such an embodiment, the server accepts PlayerIDs from the preselected number of players. Additional players are not activated by the server. The SecondaryID can also be used as a backup should the PlayerID be lost or corrupted. The server can use the SecondaryID to reactivate a player, if necessary.

In one embodiment, additional identifiers, such as a GroupID can be added to a player through a similar activation process. The message sent from the server to the player includes the PlayerID and the GroupID rather than the SecondaryID. Other identifiers used for other purposes can be added in a similar manner.

The player receives the signed message including the PlayerID and the SecondaryID, 430. In one embodiment, the player regenerates the PlayerID, 440. Regeneration of the PlayerID prevents the player from being copied or moved during activation processing by the server.

The player authenticates the message using digital signature protocols, 450. If the message is authentic and unaltered activation continues. Otherwise, the player either continues to wait for an authentic message or the player produces an activation error message. The authenticated message is stored for later use, 460.

Figure 5:
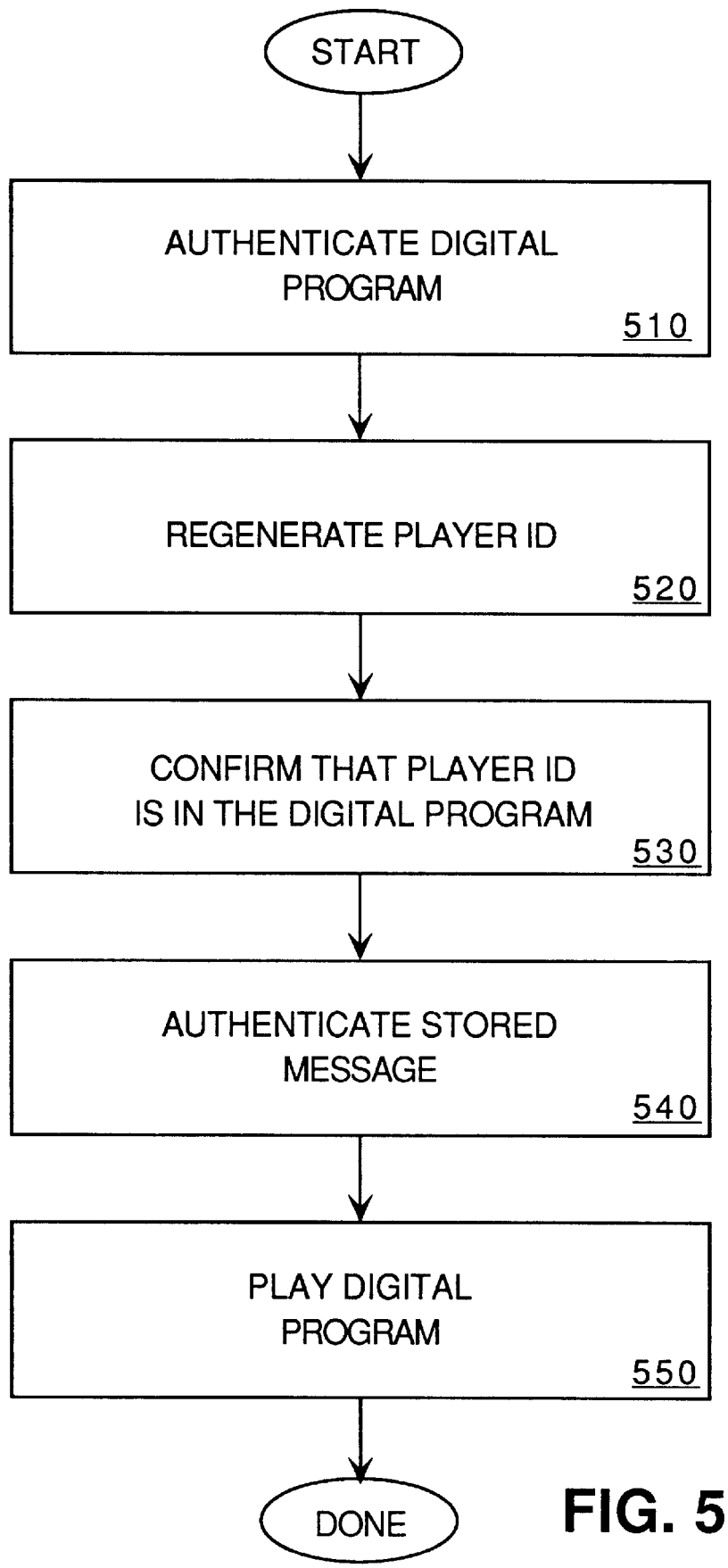
FIG. 5 is one embodiment of a flow diagram for player check of a targeted program.

FIG. 5 is one embodiment of a flow diagram for player check of a targeted program. The player checks a targeted program prior to playing to program to determine whether the playback is authorized.

The player authenticates the digital program, 510. In one embodiment, the player determines whether the digital program includes one or more digital signatures authenticating that the digital program has been received from an authorized source and the digital program is unaltered. Authentication can be performed by procedures other than digital signatures.

The player regenerates the PlayerID, 520. Regeneration of the PlayerID as part of a check for targeted programs protects against copying or moving of the player after the digital program has been received but before the digital program is played. The player checks the authenticated digital program to determine whether the PlayerID or other appropriate identifiers are included in the digital program, 530. If the PlayerID is not included in the digital program, the player does not play the digital program. Other identifiers, such as the SecondaryID or group identifiers can be used in place of the PlayerID.

The player authenticates the stored message received from the server having the PlayerID and the SecondaryID, or any other relevant identifiers. Authentication of the stored message prevents an unauthorized user from replacing the authentic message with an unauthorized message in an attempt to clone the player. The player then plays the digital program 550.

Figure 6:
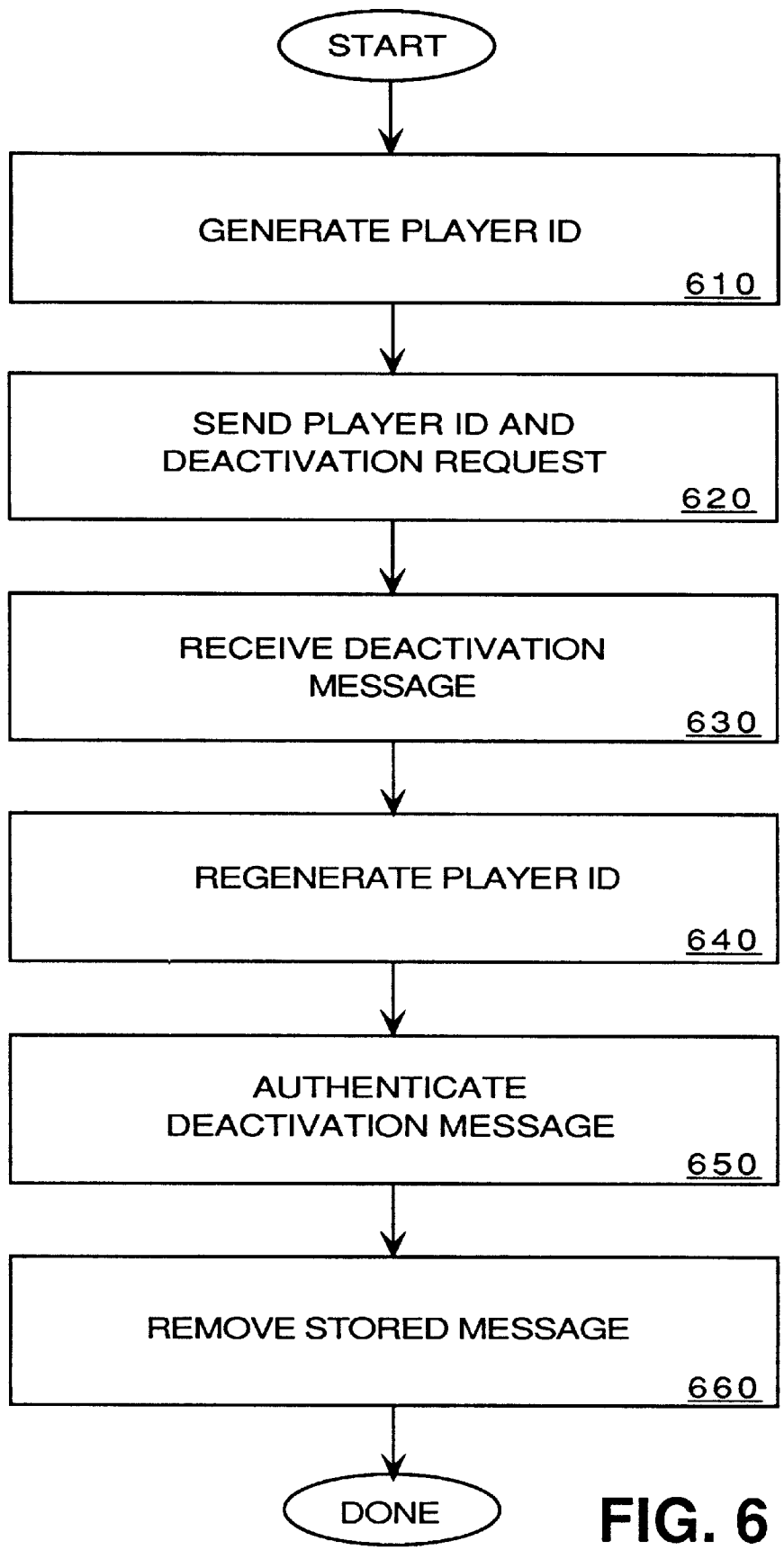
FIG. 6 is one embodiment of a flow diagram for player deactivation.

FIG. 6 is one embodiment of a flow diagram for player deactivation. If activation is based on a particular hardware or software element, such as an operating system, modifications of the element, such as upgrades, require the player to be deactivated. The player is then reactivated after the modification.

The player generates the PlayerID as described above, 610. The PlayerID and a deactivation request are sent to the server, 620. The server removes the association of the PlayerID and the SecondaryID and other identifiers stored in the server. In one embodiment, the server generates a message having the PlayerID and <null>; however, other indications of deactivation can be used. The message is signed and sent to the player.

The player receives the deactivation message, 630. The player regenerates the PlayerID, 640. The player authenticates the deactivation message, 650. The player removes the stored message having the PlayerID and the SecondaryID. Other messages with the PlayerID and other identifiers, if any, are also removed.

In the foregoing specification, the present invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method for activating a digital information player comprising:
   generating a player identifier that identifies the player;
   sending the player identifier and an activation request to a server;
   receiving from the server an activation message having the player identifier and a secondary identifier;
   authenticating the activation message; and
   storing the activation message if the activation message is authentic, wherein the authentic activation message is required for the digital information player to play digital content.

2. The method of claim 1, further comprising:
   regenerating the player identifier after receiving the message;
   comparing the regenerated player identifier to the player identifier of the message; and
   rejecting the message if the regenerated player identifier and the player identifier of the message do not match.

3. The method of claim 1 wherein authenticating the message comprises analyzing a digital signature to determine authenticity of the message.

4. A method for activating a digital information player comprising:
   generating a player identifier that identifies the player by:
      determining an operating system installation identifier;
      determining an operating system installation date; and
      generating the player identifier based on the operating system installation identifier and the operating system installation date;
   sending the player identifier and an activation request to a server;
   receiving from the server an activation message having the player identifier and a secondary identifier;
   authenticating the activation message; and
   storing the activation message if the activation message is authentic.

5. A method for activating a digital information player comprising:
   generating a player identifier that identifies the player;
   sending the player identifier and an activation request to a server;
   receiving from the server an activation message having the player identifier and a secondary identifier;
   authenticating the activation message;
   storing the activation message if the activation message is authentic; and
   deactivating the player prior to upgrade of software components affecting the player identifier, wherein deactivating the player comprises:
      sending the player identifier and a deactivation request to the server;
      receiving a deactivation message from the server;
      authenticating the deactivation message; and
      removing the activation message.

6. A machine-readable medium having stored thereon sequences of instructions, which when executed by a processor cause an electronic system to:
   generate a player identification for a player that identifies the player;
   send the player identification and an activation request to a server;
   receive from the server an activation message having the player identification and a secondary identification;
   authenticate the activation message; and
   store the activation message if the activation message is authentic, wherein the authentic activation message is required for the digital information player to play digital content.

7. The machine-readable medium of claim 6 further comprising sequences of instructions, which when executed cause the processor to:
   regenerate the player identifier after receiving the message;

compare the regenerated player identifier to the player identifier of the message; and reject the message if the regenerated player identifier and the player identifier of the message do not match.

8. The machine-readable medium of claim 6 wherein sequences of instructions that cause the processor to authenticate the message further comprise sequences of instructions that cause the processor to analyze a digital signature to determine authenticity of the message.

9. A machine-readable medium having stored thereon sequences of instructions, which when executed by a processor cause an electronic system to:

generate a player identification for a player that identifies the player by
  determining an operating system installation identifier;
  determining an operating system installation date; and
  generating the player identifier based on the operating system installation identifier and the operating system installation date;

send the player identification and an activation request to a server;

receive from the server an activation message having the player identification and a secondary identification;

authenticate the activation message; and store the activation message if the activation message is authentic.

10. A machine-readable medium having stored thereon sequences of instructions, which when executed by a processor cause an electronic system to:

generate a player identification for a player that identifies the player;

send the player identification and an activation request to a server;

receive from the server an activation message having the player identification and a secondary identification;

authenticate the activation message;

store the activation message if the activation message is authentic; and deactivate the player prior to upgrade of software components affecting the player identifier, wherein the sequences of instructions that cause the processor to deactivate the player further comprise sequences of instructions that cause the processor to:

send the player identifier and a deactivation request to the server;

receive a deactivation message from the server;

authenticate the deactivation message; and remove the activation message.

11. An architecture that provides playback of digital information comprising:

a server that stores multiple digital programs; and a computer system coupled to the server, the computer system running a player that, prior to playing a selected digital program from the multiple digital programs, generates a player identifier uniquely identifying the player and sends the player identifier to the server with an activation request;

wherein the server receives the activation request and the player identifier and generates a secondary identifier to be associated with the player identifier, the server further sends the secondary identifier and the player identifier to the player in a single message;

further wherein the player receives the message and authenticates the message prior to storing the message if the message is authentic, the authentic activation message being required for the player to play digital content.

* * * * *